(12) United States Patent
Parrish et al.

(10) Patent No.: US 7,156,957 B1
(45) Date of Patent: Jan. 2, 2007

(54) UV INDUCED OXIDATION OF NITRIC OXIDE

(75) Inventors: Clyde F. Parrish, Melbourne, FL (US); Dale E. Lueck, Merritt Island, FL (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 566 days.

(21) Appl. No.: 10/440,543

(22) Filed: May 15, 2003

(51) Int. Cl.
*B01D 53/00* (2006.01)
*B01D 53/56* (2006.01)
*A61L 9/00* (2006.01)
*A61L 2/00* (2006.01)

(52) U.S. Cl. .................. 204/157.3; 422/4; 422/23; 422/24; 423/235; 423/239.1

(58) Field of Classification Search ............. 204/157.3; 422/4, 23, 24; 423/235, 239.1
See application file for complete search history.

(56) References Cited

U.S. PATENT DOCUMENTS

| | | |
|---|---|---|
| 3,079,232 A | 2/1963 | Andersen et al. |
| 3,653,185 A | 4/1972 | Scott et al. |
| 3,869,362 A | 3/1975 | Machi et al. |
| 3,984,296 A | 10/1976 | Richards |
| 3,997,415 A | 12/1976 | Machi et al. |
| 4,061,117 A * | 12/1977 | Ikeura ............ 123/41.31 |
| 4,160,013 A | 7/1979 | Whelan |
| 5,114,670 A * | 5/1992 | Duffey ............ 422/24 |
| 5,256,379 A * | 10/1993 | DeLoach ............ 422/186.3 |
| 5,863,413 A * | 1/1999 | Caren et al. ............ 205/688 |
| 6,030,506 A | 2/2000 | Bittenson et al. |
| 6,048,500 A | 4/2000 | Caren et al. |
| 6,253,544 B1 | 7/2001 | Miller et al. |
| 6,264,899 B1 | 7/2001 | Caren et al. |
| 6,969,486 B1 * | 11/2005 | Cooper et al. ............ 422/4 |

OTHER PUBLICATIONS

Merriam-Webster's Collegiate Dictionary, tenth edition, p. 1306, c. no month, 1997.*

* cited by examiner

*Primary Examiner*—Edna Wong
(74) *Attorney, Agent, or Firm*—Randall M. Heald

(57) ABSTRACT

Nitric oxide in a gaseous stream is converted to nitrogen dioxide using oxidizing species generated at least in part using in situ UV radiation sources. The sources of the oxidizing species include oxygen and/or hydrogen peroxide. The oxygen may be a component of the gaseous stream or added to the gaseous stream, preferably near a UV radiation source, and is converted to ozone by the UV irradiation. The hydrogen peroxide is decomposed through a combination of vaporization and UV irradiation. The hydrogen peroxide is preferably stored at stable concentration levels, i.e., approximately 50% by volume, and increased in concentration in a continuous process preceding vaporization within the flow channel of the gaseous stream and in the presence of the UV radiation sources.

11 Claims, 2 Drawing Sheets

UV INDUCED OXIDATION OF NITRIC OXIDE

STATEMENT OF GOVERNMENT INTEREST

The invention described herein was made by an employee of the United States Government and may be manufactured and used by or for the Government of the United States of America for governmental purposes without the payment of any royalties thereon or therefor.

TECHNICAL FIELD OF THE INVENTION

The present invention relates generally to removal of nitric oxide (NO) from gaseous streams and in particular to the reducing nitric oxide content using UV induced oxidation.

BACKGROUND OF THE INVENTION

Control of air pollution is a serious concern. Industrial plants and power plants often utilize combustion processes, such as in the treatment of chemical waste streams or in the generation of power. These combustion processes generally include nitric oxide (NO) as a combustion by-product. Nitric oxide and other nitrogen-containing emissions are generally undesirable as contributors to "acid rain."

Gas streams from combustion processes are often scrubbed, i.e., contacted with water, to remove many of their contaminants. However, effective removal of nitric oxide from a gas stream is complicated by its low water solubility. To increase the effectiveness of a water scrubber system, it is necessary to oxidize the nitric oxide to nitrogen dioxide ($NO_2$).

Nitric oxide does slowly oxidize in air to form nitrogen dioxide, one step in the manufacture of nitric acid from the combustion of ammonia. However, to make the oxidation of nitric oxide effective at low concentrations, some oxidizer more effective than air is required to increase the rate of reaction, such as ozone, or atomic oxygen. In fact, these materials have been used for this purpose. The problem with these materials is their high cost and complexity.

For the reasons stated above, and for other reasons stated below that will become apparent to those skilled in the art upon reading and understanding the present specification, there is a need in the art for alternative methods and apparatus for removing nitric oxide from gaseous streams.

SUMMARY

Combustion flue gas typically contains unacceptable levels of nitric oxide. It is desirable to reduce the nitric oxide content of the flue gas or other gaseous streams from industrial processes prior to venting to the atmosphere. An accepted manner of reducing nitric oxide content is to convert it to nitrogen dioxide, which is more amenable to water scrubbing. For the various embodiments, nitric oxide in a gaseous stream is converted to nitrogen dioxide using oxidizing species generated at least in part using in situ UV radiation sources. The sources of the oxidizing species include oxygen and/or hydrogen peroxide. The oxygen may be a component of the gaseous stream or added to the gaseous stream, preferably near a UV radiation source, and is converted to ozone by the UV irradiation. The hydrogen peroxide is decomposed through a combination of vaporization and UV irradiation. The hydrogen peroxide is preferably stored at stable concentration levels, i.e., approximately 50% or less by volume, and increased in concentration in a continuous process preceding vaporization within the flow channel of the gaseous stream and in the presence of the UV radiation sources.

For one embodiment, the invention provides a method of reducing nitric oxide content of a gaseous stream. The method includes passing the gaseous stream through a flow channel and vaporizing a hydrogen peroxide solution within the flow channel in the presence of the gaseous stream. The method further includes concurrently irradiating the vaporized hydrogen peroxide with UV radiation. For a further embodiment, the method further includes adding oxygen to the gaseous stream and irradiating the oxygen concurrently with irradiating the vaporized hydrogen peroxide.

For another embodiment, the invention provides a method of treating a gaseous stream containing nitric oxide. The method includes irradiating the gaseous stream with UV radiation, thereby converting oxygen within the gaseous stream to ozone. The method further includes reacting at least a portion of the nitric oxide with the ozone to generate nitrogen dioxide and scrubbing the gaseous stream to remove at least a portion of the nitrogen dioxide.

For yet another embodiment, the invention provides a system for treating a gaseous stream. The gas treatment system includes a flow channel for passing the gaseous stream, a vaporizing surface within the flow channel adapted to heat within a range of approximately 200° C. to approximately 500° C., and a UV radiation source focused at the vaporizing surface. The system further includes a source of a hydrogen peroxide solution, a preheater interposed between the source of the hydrogen peroxide solution and the vaporizing surface, and a nozzle interposed between the preheater and the vaporizing surface for directing the hydrogen peroxide solution against the vaporizing surface. For a further embodiment, the system further includes a source of oxygen for injecting oxygen near the UV radiation source.

The invention further includes methods and apparatus of varying scope.

DETAILED DESCRIPTION OF THE INVENTION

In the following detailed description of the preferred embodiments, reference is made to the accompanying drawings that form a part hereof, and in which is shown by way of illustration specific preferred embodiments in which the inventions may be practiced. These embodiments are described in sufficient detail to enable those skilled in the art to practice the invention, and it is to be understood that other embodiments may be utilized and that logical, mechanical and chemical changes may be made without departing from the spirit and scope of the present invention. The following detailed description is, therefore, not to be taken in a limiting sense, and the scope of the present invention is defined only by the appended claims and equivalents thereof.

The various embodiments of the invention utilize UV (ultraviolet) light to produce ozone ($O_3$) or to decompose hydrogen peroxide ($H_2O_2$) to form hydroperoxy ($HO_2 \cdot$) and hydroxyl ($\cdot OH^-$) free radicals for the oxidation of gas stream components, such as nitric oxide produced in a combustion process. When ozone is the oxidizing species, then oxygen ($O_2$) in the gas stream, or oxygen added to the stream, is converted to ozone within the system through the irradiation with UV light. When hydrogen peroxide is used to oxidize the nitric oxide, then the UV radiation is configured to focus on a hydrogen peroxide vaporizing surface. To further increase the decomposition rate of the hydrogen peroxide, a preheating operation can be utilized prior to vaporization. Preheating above a boiling point of the hydrogen peroxide solution can be used to enrich the peroxide concentration. This increases the concentration of hydrogen peroxide at the vaporization point. The vaporizer can include a catalytic surface to further accelerate the decomposition of the hydrogen peroxide.

Figure 1:
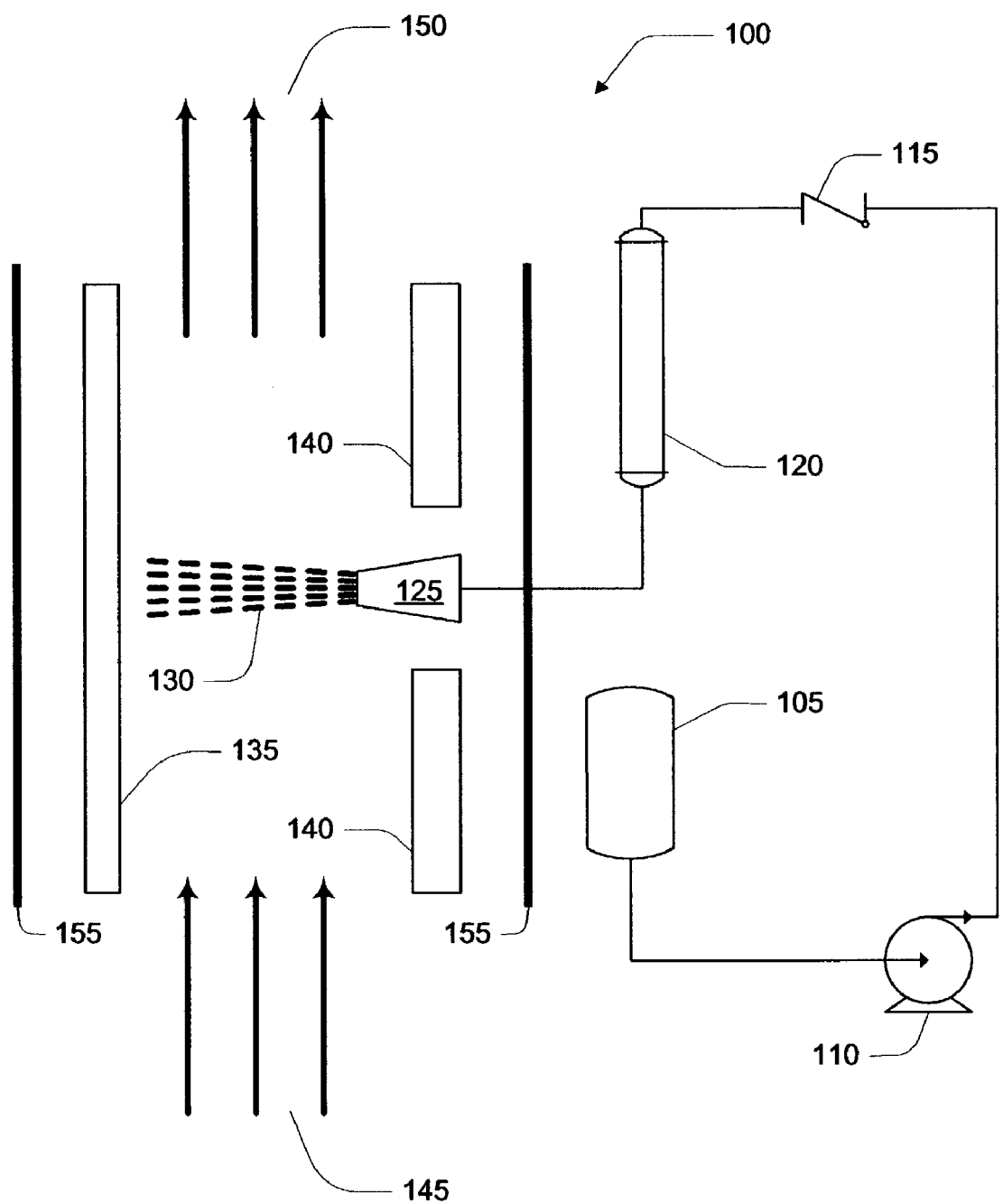
FIG. 1 is a schematic of a system for treating gas streams in accordance with an embodiment of the invention.

FIG. 1 is a schematic of a system for treating gas streams in accordance with an embodiment of the invention. The gas treatment system 100 is adapted for the treatment of a gaseous stream 145 passing through a flow channel 155, such as a pipe or flue. The gas treatment system 100 of FIG. 1 will use hydrogen peroxide as an oxidizer source for use in treatment of the gaseous stream 145. For one embodiment, the gaseous stream 145 contains an oxidizable component. For a further embodiment, the oxidizable component is nitric oxide. The gaseous stream 145 may contain more than one oxidizable component. The gaseous stream 145 may further contain one or more non-oxidizable components. For one embodiment, the gaseous stream 145 comprises the gaseous by-products of a combustion process.

The hydrogen peroxide solution is sourced from a storage vessel 105. For one embodiment, the hydrogen peroxide solution contained in storage vessel 105 has a concentration of approximately 30–50% by volume. Hydrogen peroxide solutions above about 50% by volume are generally considered to be unstable.

A pump 110 may be utilized to generate a pressure of the oxidizer source greater than a pressure within the flow channel 155, thereby facilitating transfer of the hydrogen peroxide solution into the flow channel 155. Other means may also be used to transport the hydrogen peroxide solution into the flow channel 155. For example, the storage vessel 105 may be maintained at a pressure greater than that of the flow channel 155. Additionally, the storage vessel 105 may be elevated above a point of entry into the flow channel 155 such that gravitational forces facilitate flow from the storage vessel 105 into the flow channel 155. A check valve 115 may be used to inhibit backflow within the system 100.

For one embodiment, a heat exchanger or preheater 120 is interposed between the storage vessel 105 and the flow channel 155. Preheated hydrogen peroxide solution will generally be more prone to decompose into its radicals, i.e., hydroxyl radicals and/or hydroperoxy radicals. For a further embodiment, the preheater 120 brings the temperature of the hydrogen peroxide solution above its boiling point, thereby increasing its concentration. This will facilitate use of a higher concentration hydrogen peroxide solution during the treatment of the gaseous stream without requiring storage of hydrogen peroxide at increased concentration levels, which are more difficult and/or hazardous to contain. Additionally, the rate of decomposition increases by a factor of approximately 2.3 for each 10° C. increase in temperature. For one embodiment, the preheater 120 brings the temperature of the hydrogen peroxide solution to approximately 140° C., which will generally increase its concentration to approximately 70% by volume. Preheating the hydrogen peroxide solution above its boiling point will vaporize a portion of the contained water, thus helping to propel the concentrated hydrogen peroxide solution through a nozzle 125. The nozzle 125 is positioned to direct the concentrated hydrogen peroxide solution 130 to impinge on a surface of a vaporizer 135. The vaporizer 135 is any heated surface, such as a heated metal plate. Alternatively, a heated nozzle 125 may act as the vaporizer 135.

The surface of the vaporizer 135 is heated to further aid decomposition of the concentrated hydrogen peroxide solution 130. For one embodiment, the surface of the vaporizer 135 is heated within a range of approximately 200° C. to approximately 500° C. For another embodiment, the surface of the vaporizer 135 is catalytic to still further aid decomposition. For example, the surface of the vaporizer 135 may be coated with or constructed of catalytic metals, such as Fe(II), Cr(II), Pt black or Pd. Catalytic oxides, such as, FeO, $Fe_2O_3$, $Fe_3O_4$, $MnO_2$, or $MoO_2$ may also be used.

As the concentrated hydrogen peroxide solution 130 impinges on the heated surface of the vaporizer 135, the hydrogen peroxide solution 130 is decomposed and hydroxyl radicals and hydroperoxy radicals are generated within the flow channel 155.

One or more UV radiation sources, such as UV lamps 140, are contained within the flow channel 155. The UV radiation is useful in increasing the decomposition rate of the concentrated hydrogen peroxide solution 130. The UV lamps 140 may utilize a quartz envelope and more preferably a Suprasil® quartz envelope. Suprasil® is a type of fused silica, or quartz, with high purity and excellent homogeneity available from Heraeus Optics, Inc., Buford, Ga., USA. Suprasil® quartz has virtually no granularity or striae, and the index variation is less than 10 ppm. Because Suprasil® quartz has a metallic impurity content less than 8 ppm, the UV transmission is superior and fluorescence is minimal. Being fused silica, Suprasil® quartz exhibits high strength and low thermal expansion. Because of its superior UV transmission, UV lamps 140 utilizing a Suprasil® quartz envelope tend to promote faster decomposition of the concentrated hydrogen peroxide solution 130 than a UV lamp 140 with a standard glass envelope.

The hydroxyl and/or hydroperoxy radicals generated from the decomposition of the concentrated hydrogen peroxide solution 130 within the flow channel 155 rapidly react with the one or more oxidizable components of the gaseous stream 145. The resulting exit gaseous stream 150 is thus reduced of its oxidizable components. As an example, where the gaseous stream 145 contains nitric oxide at the input of the flow channel 155, the gaseous stream 150 at the output of the flow channel 155 will have a reduced concentration of nitric oxide as at least a portion of the nitric oxide will have been oxidized to nitrogen dioxide. The output of the flow channel 155 may then be fed to a scrubber (not shown) for removal of the nitrogen dioxide.

In addition to hydroxyl and hydroperoxy radicals, ozone is another oxidizing species useful in treating gaseous streams. When ozone is the oxidizing species, then oxygen in the gaseous stream, or oxygen added to the system near the source of the UV radiation, will be used to produce the ozone.

Figure 2:
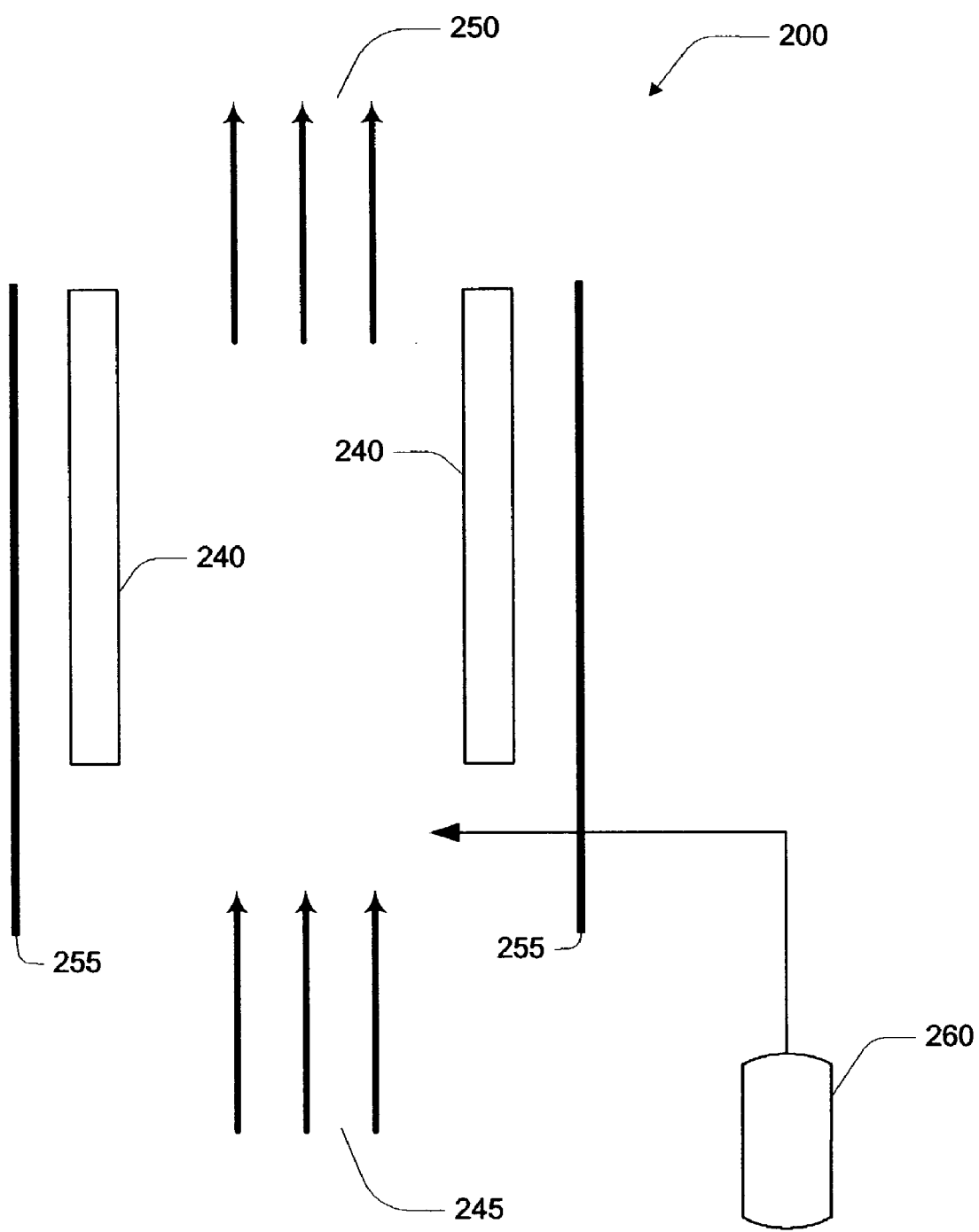
FIG. 2 is a schematic of a system for treating gas streams in accordance with another embodiment of the invention.

FIG. 2 is a schematic of a system for treating gas streams in accordance with another embodiment of the invention. The gas treatment system 200 is adapted for the treatment of a gaseous stream 245 passing through a flow channel 255, such as a pipe or flue. The gas treatment system 200 of FIG. 2 will use ozone as an oxidizer source for use in treatment of the gaseous stream 245. For one embodiment, the gaseous stream 245 contains an oxidizable component. For a further embodiment, the oxidizable component is nitric oxide. The gaseous stream 245 may contain more than one oxidizable component. The gaseous stream 245 may further contain one or more non-oxidizable components. For one embodiment, the gaseous stream 245 comprises the gaseous by-products of a combustion process.

One or more UV radiation sources, such as UV lamps 240, are contained within the flow channel 255. The UV radiation is useful in generating ozone from oxygen. The UV lamps 240 may utilize a quartz envelope and more preferably a Suprasil® quartz envelope. To increase the oxygen content of the system 200, and to correspondingly increase the resulting generation of ozone, oxygen may be added to the system such as from a storage vessel 260. Alternatively, air may be mixed with the incoming gaseous stream 245 as the source of oxygen. By creating ozone in situ, oxidation of the gaseous stream 245 is improved without the need of an ozone generator. Additionally, it is expected that the ozone yield would be improved by generating the ozone at the reaction site as opposed to generating ozone outside of the system 200 and distributing the externally-generated ozone to the flow channel 255.

For a further embodiment, the treatment system may use a hydrogen peroxide solution to generate hydroxyl and/or hydroperoxy radicals and oxygen to generate ozone using the same UV radiation sources. With reference to FIG. 1, for systems containing free oxygen in the incoming gaseous stream, it is inherent that the oxygen in the incoming gaseous stream 145 will generate ozone when exposed to the UV lamps 140. For systems containing no free oxygen, or low free oxygen, an oxygen source 260 (see FIG. 2) could be added to inject oxygen near the UV lamps 140. It is expected that the use of oxygen and a hydrogen peroxide solution in combination as multiple oxidizer sources will further enhance the reduction of nitric oxide from the gaseous stream 145.

In addition, while a single injection source of oxygen or a single injection source of hydrogen peroxide may be sufficient for small flow channels or flues, for larger systems, multiple injection sites may be used to distribute the generation of oxidizing species throughout the flow channel. Similarly, multiple vaporizers and UV radiation sources may be used to increase the capacity of the system.

CONCLUSION

Various embodiments have been described to convert nitric oxide to nitrogen dioxide using oxidizing species generated at least in part using in situ UV radiation sources. The sources of the oxidizing species include oxygen and/or hydrogen peroxide. The oxygen may be a component of the gaseous stream or added to the gaseous stream, preferably near a UV radiation source, and is converted to ozone by the UV irradiation. The hydrogen peroxide is decomposed through a combination of vaporization and UV irradiation. The hydrogen peroxide is preferably stored at stable concentration levels, i.e., approximately 50% by volume, and increased in concentration in a continuous process preceding vaporization within the flow channel of the gaseous stream and in the presence of the UV radiation sources.

Although specific embodiments have been illustrated and described herein, it will be appreciated by those of ordinary skill in the art that any arrangement that is calculated to achieve the same purpose may be substituted for the specific embodiment shown. This application is intended to cover any adaptations or variations of the present invention. Therefore, it is manifestly intended that this invention be limited only by the claims and the equivalents thereof.

What is claimed is:

1. A method of reducing a nitric oxide content of a gaseous stream, comprising:
    passing the gaseous stream through a flow channel;
    increasing the concentration of a stream of hydrogen peroxide solution in the flow channel by preheating the hydrogen peroxide solution to at least approximately 140° C.;
    vaporizing the hydrogen peroxide solution within the flow channel in the presence of the gaseous stream by impinging the hydrogen peroxide solution on a heated surface contained within the flow channel, thereby generating vaporized hydrogen peroxide; and
    concurrently irradiating the vaporized hydrogen peroxide with UV radiation.

2. The method of claim 1, further comprising:
    adding oxygen to the gaseous steam; and
    irradiating the oxygen concurrently with irradiating the vaporized hydrogen peroxide.

3. The method of claim 2, wherein adding oxygen occurs near a source of the UV radiation.

4. The method of claim 1, wherein increasing the concentration comprises increasing the concentration from approximately 50% or less by volume to approximately 70% or more by volume.

5. The method of claim 1, wherein the heated surface is a heated catalytic surface.

6. The method of claim 5, wherein the catalytic surface comprises at least one catalytic metal selected from the group consisting of Fe(II), Cr(II), Pt black and Pd.

7. The method of claim 5, wherein the catalytic surface comprises at least one catalytic oxide selected from the group consisting of FeO, $Fe_2O_3$, $Fe_3O_4$, $MnO_2$, and $MoO_2$.

8. The method of claim 1, wherein the heated surface is heated within a range of approximately 200° C. to approximately 500° C.

9. The method of claim 1, wherein irradiating the vaporized hydrogen peroxide comprises irradiating the vaporized hydrogen peroxide through a quartz envelope.

10. The method of claim 1, wherein irradiating the vaporized hydrogen peroxide comprises irradiating the vaporized hydrogen peroxide through a quartz envelope having an index variation of less than 10 ppm and a metallic impurity content of less than 8 ppm.

11. A method of reducing a nitric oxide content of a gaseous steam, comprising:
    passing the gaseous stream through a flow channel;
    preheating a stream of hydrogen peroxide solution to increase the concentration of the hydrogen peroxide solution;
    vaporizing the hydrogen peroxide solution within the flow channel in the presence of the gaseous stream by impinging the hydrogen peroxide solution onto a heated surface contained within the flow channel; thereby generating vaporized hydrogen peroxide; and
    concurrently irradiating the vaporized hydrogen peroxide with UV radiation.

* * * * *